(12) United States Patent
Kirk

(10) Patent No.: US 7,329,097 B2
(45) Date of Patent: Feb. 12, 2008

(54) CONNECTING ARRANGEMENT

(75) Inventor: Geoffrey E Kirk, Loughborough (GB)

(73) Assignee: Rolls Royce plc, London (GB)

( * ) Notice: Subject to any disclaimer, the term of this patent is extended or adjusted under 35 U.S.C. 154(b) by 561 days.

(21) Appl. No.: 10/954,279

(22) Filed: Oct. 1, 2004

(65) Prior Publication Data

US 2005/0118020 A1   Jun. 2, 2005

(30) Foreign Application Priority Data

Oct. 3, 2003   (GB)   ................................. 0323230.3

(51) Int. Cl.
*F01D 25/26* (2006.01)
(52) U.S. Cl. ................. 415/213.1; 415/214.1
(58) Field of Classification Search ............. 415/213.1, 415/214.1
See application file for complete search history.

(56) References Cited

U.S. PATENT DOCUMENTS

| | | | |
|---|---|---|---|
| 2,165,052 A | 7/1939 | Hering | |
| 2,784,675 A * | 3/1957 | Farrell | ......................... 285/321 |
| 4,202,654 A * | 5/1980 | Marlow | ....................... 415/113 |
| 4,448,449 A | 5/1984 | Halling | |
| 4,772,033 A | 9/1988 | Nash | |
| 5,737,913 A * | 4/1998 | Terry | ........................... 60/796 |

FOREIGN PATENT DOCUMENTS

| | | |
|---|---|---|
| FR | 1555228 P | 1/1969 |
| GB | 598714 P | 2/1948 |
| GB | 937409 P | 9/1963 |

* cited by examiner

*Primary Examiner*—Hoang Nguyen
(74) *Attorney, Agent, or Firm*—W. Warren Taltavull; Manelli Denison & Selter PLLC

(57) ABSTRACT

A connecting arrangement is disclosed for connecting first and second articles, such as casing sections (22, 24) to each other. The connecting arrangement comprises a connector (28) comprising an outwardly extending portion, which may be a first flange (34). The outwardly extending portion is securable to an outwardly extending member, which may be a second flange (36). A securing portion (30) removably secures the connector (28) to the first article.

6 Claims, 2 Drawing Sheets

CONNECTING ARRANGEMENT

FIELD OF THE INVENTION

This invention relates to connecting arrangements. More particularly, but not exclusively, the invention relates to connecting arrangements to connect together casings for engines, for example gas turbine engines.

BACKGROUND OF THE INVENTION

The casing of a gas turbine engine, and other pieces of equipment can be formed in several sections which are connected together by means of flanges extending around the casing or the piece of equipment. Often, these flanges can inhibit transportation or restrict machining operations.

SUMMARY OF THE INVENTION

According to one aspect of this invention, there is provided a connecting arrangement to connect first and second articles to each other, comprising a connector comprising outwardly extending portion securable to an outwardly extending member on the second article, and a securing portion for removably securing the connector to the first article.

The outwardly extending portion on the connector is conveniently a radially outwardly extending portion.

The first article preferably comprises a cylindrical structure. The first article may comprise a casing or a section of a casing. The casing or section thereof may be an engine casing or section thereof, such as a casing or section thereof for a component of a gas turbine engine.

The second article preferably comprises a cylindrical structure. The second article may comprise a casing or a section of a casing, which may be an engine casing or section thereof, such as a casing for a component of a gas turbine engine.

The connector may be configured to extend at least partially around the first article. Preferably, the connector is configured to extend substantially half way round the first article.

The connecting arrangement may comprise a further connector which preferably can extend at least partially around the first article. Conveniently, the further connector can extend substantially half way round the first article, whereby each of the connectors may comprise an outwardly extending portion which may be securable to the outwardly extending member on the second article. The outwardly extending portion on the further connector is a radially outwardly extending portion.

Where the first article is generally circular in profile, the, connector may extend at least over an arc of a circle. In the preferred embodiment, the connector may extend over substantially a semi-circle. The further connector may also extend over an arc of a circle, preferably over a semi-circle.

Preferably, the securing portion comprises a first cooperating formation on the connector. The connecting arrangement may comprise a second cooperating formation on the first article. The second cooperating formation may be integral with the first article. The first and second cooperating formations may cooperatively engage each other to attach the, or each, connector to the first article.

The first and second cooperating formations may respectively comprise corresponding first and second hook formations.

Preferably, the first cooperating formation extends along the outwardly extending portion. The second cooperating formation preferably extends around the first article. Preferably, the, outwardly extending portion of the connector may be secured to the outwardly extending member on the second article by fastening means. The fastening means may comprise suitable threaded members, for example bolts, or nuts and bolts. Preferably, the outwardly extending portion comprises a flange. The outwardly extending member on the second article may also comprise a flange.

BRIEF DESCRIPTION OF THE DRAWINGS

An embodiment of the invention will now be described by way of example only, with reference to the accompanying drawings, in which.

DETAILED DESCRIPTION OF THE INVENTION

Figure 1:
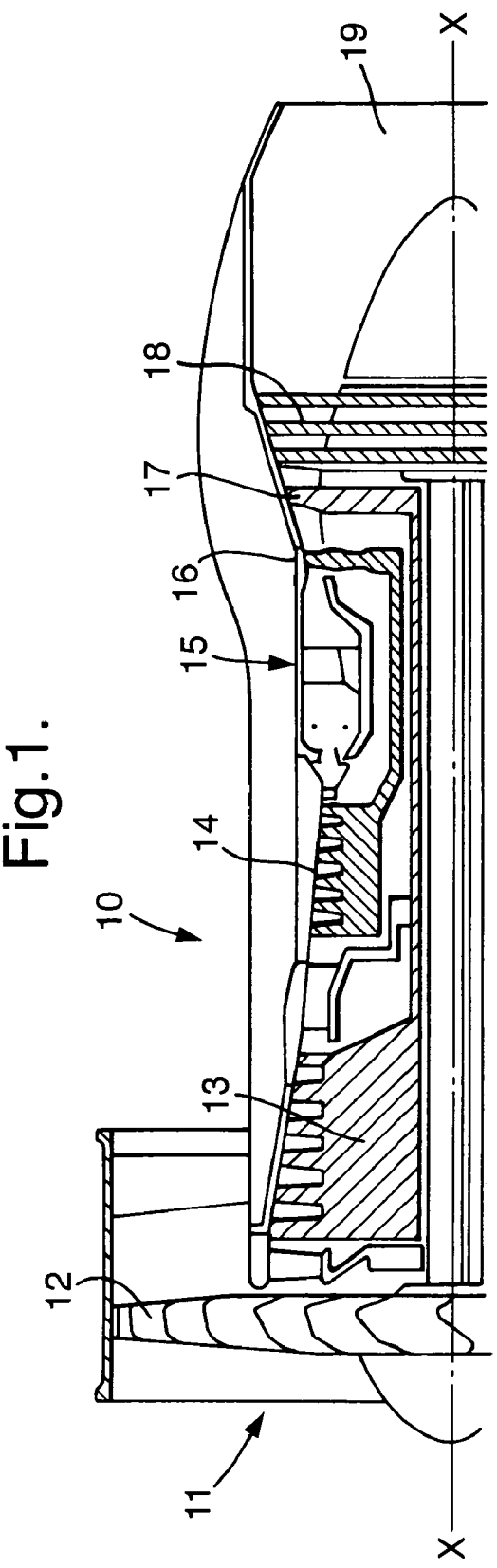
FIG. 1 shows a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Some components of the gas turbine engine 10, for example turbines and compressors, are contained within a casing.

Figure 2:
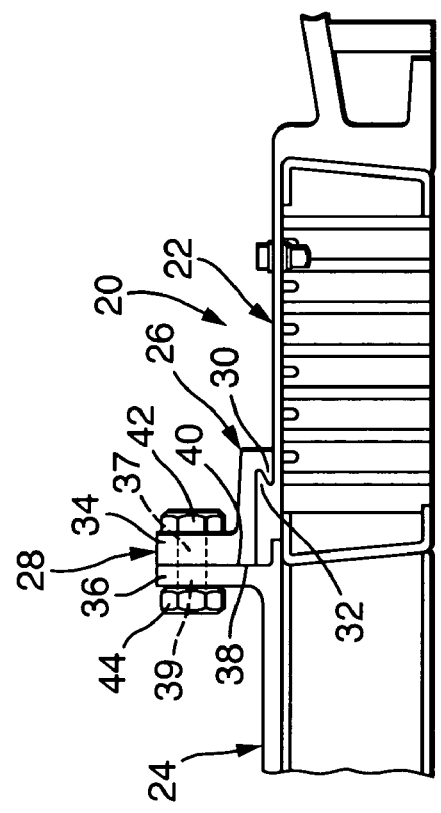
FIG. 2 is a cross-sectional side view of two sections of a casing used in the engine shown in FIG. 1, and incorporating a connecting arrangement; and, FIG. 3 is a perspective view of the two sections of the casing and the connecting arrangement shown in FIG. 2.
Figure 3:
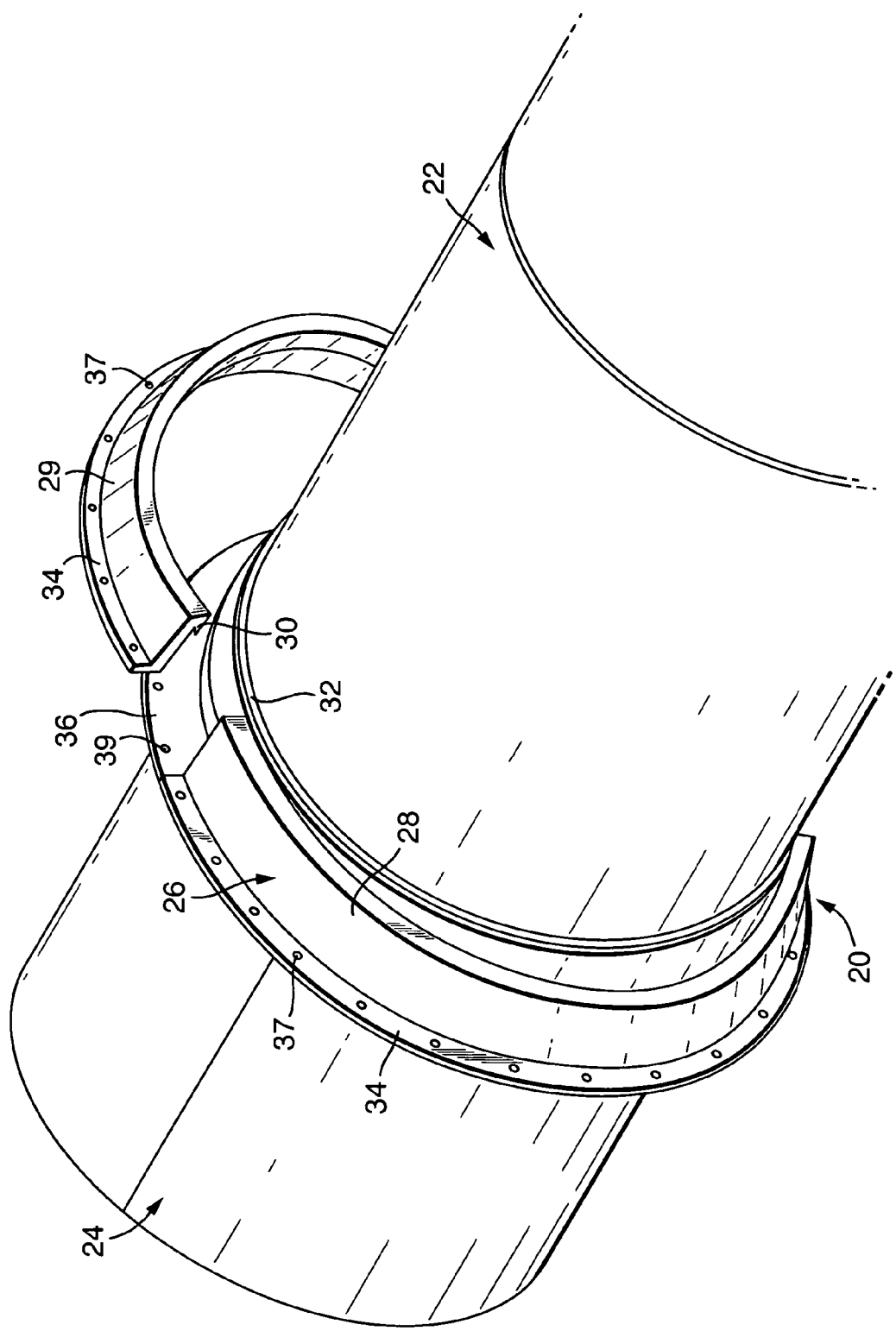

Referring to FIGS. 2 and 3 of the drawings, there is shown a casing 20 for a component of the gas turbine engine 10. The casing 20 comprises first and second sections 22, 24. The first section 22 is attached to the second section by a removable connecting member in the form of a removable clamping ring 26. The clamping ring 26 comprises two semi-circular ring members 28, 29 is shown. Each ring member includes a semi-circular first hook formation 30. The first section 22 also includes a corresponding annular second hook formation 32 which cooperatively engages each of the semi-circular first hook formations 30 on the respective members. The first hook formations 30 are each provided on a respective one of the ring members 28 and the second hook formation 32 extends around the circumference of the first section 22 of the casing, 22 as shown.

Each clamping ring member 28, 29 also includes a radially outwardly extending portion in the form of a first radially outwardly extending flange 34.

A corresponding radially outwardly extending second flange 36 is provided integrally on the second casing section 24, whereby when the first hook formation 30 on each of the clamping ring members 28 cooperatively engages the second hook formation 32 on the first casing section 22, the first and second flanges 34, 36 engage each other at their respective axially facing surfaces 38, 40.

The first and second flanges 34, 36 define a plurality of corresponding apertures 37, 39. The apertures 37, 39 in the first and second flanges 34, 36 can be aligned with each other so that shanks of bolts 42 can be inserted therethrough and nuts 44 tightened thereon. The clamping ring 26 is secured to the second flange 36 and thereby to the second casing section 24. Also the clamping ring 26 is secured to the first casing section 22 via the co-operative engagement of the first and second hook formations 30, 32. Thus the first casing section 12 and the second casing section 14 are connected together.

There is thus described a connection arrangement which enables two sections of an engine casing, for example an engine casing of a gas turbine engine to be connected together. The embodiment described above has the advantage that it allows the first casing section to be transported through restricted openings or machined without any flange obstructing transportation or machining.

Various modifications can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A generally circular cross-section gas turbine engine casing comprising first and second sections attached to each other by a removable connecting member, said removable connecting member and said first of said casing sections including corresponding annular axially extending hook formations for cooperative inter-engagement with each other, said removable connecting member being additionally provided with a radially extending flange for attachment to a corresponding radially extending flange provided on the second of said casing sections, means being provided to detachably secure said flanges together, the annular hook formation on said removable connecting member extending around the circumference of said first casing section.

2. A generally circular cross-section gas turbine engine casing as claimed in claim 1 wherein said connecting member is annular.

3. A generally circular cross-section gas turbine engine casing as claimed in claim 2 wherein said connecting member comprises at least two portions.

4. A generally circular cross-section gas turbine engine casing as claimed in claim 3 wherein said connecting member portions each extend substantially half way around said first casing section.

5. A generally circular cross-section gas turbine engine casing as claimed in claim 1 wherein said means to detachably secure said flanges together comprises fasteners.

6. A generally circular cross-section gas turbine engine casing as claimed in claim 5 wherein said fasteners are nuts and bolts, said flanges including apertures to receive said bolts.

* * * * *